(12) United States Patent
Sherry et al.

(10) Patent No.: US 11,471,765 B2
(45) Date of Patent: Oct. 18, 2022

(54) HANDWRITING RECOGNITION USING CARDINAL DIRECTIONS BETWEEN SAMPLE POINTS

(71) Applicant: Sony Interactive Entertainment Inc., Tokyo (JP)

(72) Inventors: Mark Sherry, San Mateo, CA (US); Steven Osman, San Mateo, CA (US)

(73) Assignee: Sony interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/107,202

(22) Filed: Nov. 30, 2020

(65) Prior Publication Data
US 2022/0168633 A1    Jun. 2, 2022

(51) Int. Cl.
*A63F 13/42* (2014.01)
*A63F 13/2145* (2014.01)
*G06N 20/10* (2019.01)

(52) U.S. Cl.
CPC .......... *A63F 13/42* (2014.09); *A63F 13/2145* (2014.09); *G06N 20/10* (2019.01); *A63F 2300/1075* (2013.01); *A63F 2300/6045* (2013.01)

(58) Field of Classification Search
None
See application file for complete search history.

(56) References Cited

U.S. PATENT DOCUMENTS

| | | | |
|---|---|---|---|
| 2008/0222571 A1* | 9/2008 | Yoshioka | A63F 13/10 715/841 |
| 2011/0093459 A1 | 4/2011 | Dong et al. | |
| 2012/0308138 A1 | 12/2012 | Bellegarda et al. | |
| 2015/0089432 A1* | 3/2015 | Fallah | G06F 3/04886 715/773 |
| 2015/0170372 A1 | 6/2015 | Rubins et al. | |
| 2016/0256774 A1* | 9/2016 | Oshima | A63F 13/40 |
| 2019/0294258 A1 | 9/2019 | Forlines et al. | |
| 2020/0064997 A1 | 2/2020 | Lewbel | |

OTHER PUBLICATIONS

"International Search Report and Written Opinion" dated Mar. 17, 2022, from the counterpart PCT application PCT/US21/61112.

* cited by examiner

*Primary Examiner* — Damon J Pierce
(74) *Attorney, Agent, or Firm* — John L. Rogitz

(57) ABSTRACT

A computer simulation controller such as a PlayStation® Dual Shock® computer game controller has a touchpad to input text with a "palm graffiti" or "unistrokes" type alphabet. As each letter is drawn, it is saved as a file such as a postscript file which is basically a story of the cursor coordinates (started at (1,1) move to (1,3) etc. From there, plural (e.g., fifteen (15)) coordinates (even distribution) are sampled across the set of coordinates to obtain the cardinal directions (N, NE, E, etc.) between them, which are encoded for data processing.

17 Claims, 6 Drawing Sheets

HANDWRITING RECOGNITION USING CARDINAL DIRECTIONS BETWEEN SAMPLE POINTS

FIELD

The application relates generally to technically inventive, non-routine solutions that are necessarily rooted in computer technology and that produce concrete technical improvements. In particular, the present application relates to computer simulation controllers with touchpad input.

BACKGROUND

Machine learning, sometimes referred to as deep learning, can be used for a variety of useful applications related to data understanding, detection, and/or classification.

SUMMARY

In computer simulation industries such as gaming industries, multiple data entry modes may exist that can benefit from machine learning to increase precision and robustness.

Present principles thus provide a computer simulation controller such as a PlayStation® Dual Shock® computer game controller with a touchpad to input text with a "palm graffiti" or "unistrokes" type alphabet. As each letter is drawn, it is saved as a file such as a postscript file which is basically a story of the cursor coordinates (started at (1,1) move to (1,3) etc. From there, plural (e.g., fifteen (15)) coordinates (even or regular distribution) are sampled across the set of coordinates to obtain the cardinal directions (N, NE, E, etc.) between them, which are encoded for data processing. An SVM model has been trained on about 14,000 data points, obtaining around 97/95% train/test performance.

An apparatus includes at least one processor programmed with instructions to receive input signals from a trackpad of a computer simulation controller. The input signals represent coordinates of movement against the trackpad. The instructions are executable to sample the coordinates at an interval equaling a total number of the coordinates divided by a number of samples to render a set of sample coordinates. The total number of coordinates is an integer greater than the number of samples. The instructions are executable to determine directions between successive sample coordinates, round each direction to a respective nearest cardinal direction, and process the nearest cardinal directions using a machine learning (ML) engine to output an alpha-numeric character represented by the movement against the trackpad.

The cardinal directions can include a set of eight directions. In example embodiments the cardinal directions consist of north, northwest, west, southwest, south, southeast, east, and northeast. In general, the cardinal directions include a fixed number of directions separated from each other by a constant number of degrees and having fixed directions relative to a reference direction.

The number of samples may be between ten and twenty and in example implementations is fifteen.

In some embodiments the ML engine includes a support vector machine (SVM).

If desired, the instructions may be executable to bias the ML engine for recency of input.

In example embodiments the instructions can be executable to encode the directions between successive sample coordinates into binary representations.

The processor can be implemented by a computer simulation controller, a computer simulation console, a cloud server, or other computing device.

In another aspect, a device includes at least one computer storage that is not a transitory signal and that includes instructions executable by at least one processor to receive input from a touchpad, and convert the input to direction vectors. The instructions are executable to round each direction vector to a respective cardinal direction, and using the cardinal directions, output a predicted alpha-numeric character representing the input.

In another aspect, a computer-implemented method includes receiving, from a computer simulation controller, touch signals. The method includes converting the touch signals to cardinal directions and using at least one machine learning (ML) engine receiving the cardinal directions, generate an alpha-numeric character.

The details of the present application, both as to its structure and operation, can best be understood in reference to the accompanying drawings, in which like reference numerals refer to like parts, and in which:

BRIEF DESCRIPTION OF THE DRAWINGS

FIG. 7 illustrates an example encoded direction vector and/or encoded cardinal direction.

DETAILED DESCRIPTION

Figure 1:
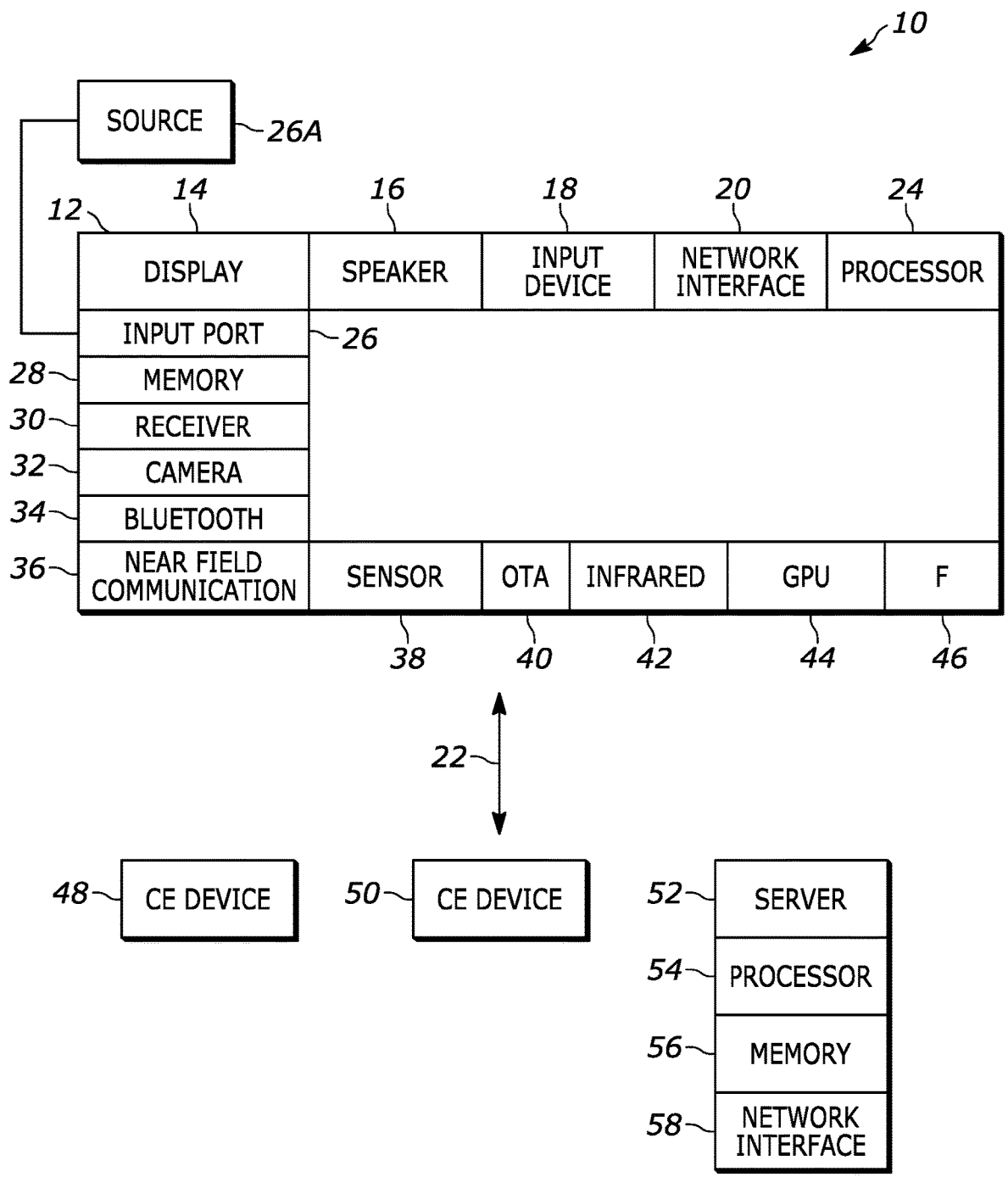
FIG. 1 is a block diagram of an example system consistent with present principles.

Now referring to FIG. 1, this disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. Note that computerized devices described in all of the figures herein may include some or all of the components set forth for various devices in FIG. 1.

The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may further include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 38 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 40 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) 44 and/or a field-programmable gate array (FPGA) 46. The GPU and/or FPGA may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 48 and a second device 50 are shown and may include similar components as some or all of the components of the AVDD 12. Fewer or greater devices may be used than shown.

The system 10 also may include one or more servers 52. A server 52 may include at least one server processor 54, at least one computer memory 56 such as disk-based or solid state storage, and at least one network interface 58 that, under control of the server processor 54, allows for communication with the other devices of FIG. 1 over the network 22, and indeed may facilitate communication between servers, controllers, and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server and may include and perform "cloud" functions such that the devices of the system 10 may access a "cloud" environment via the server 52 in example embodiments. Or the server 52 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
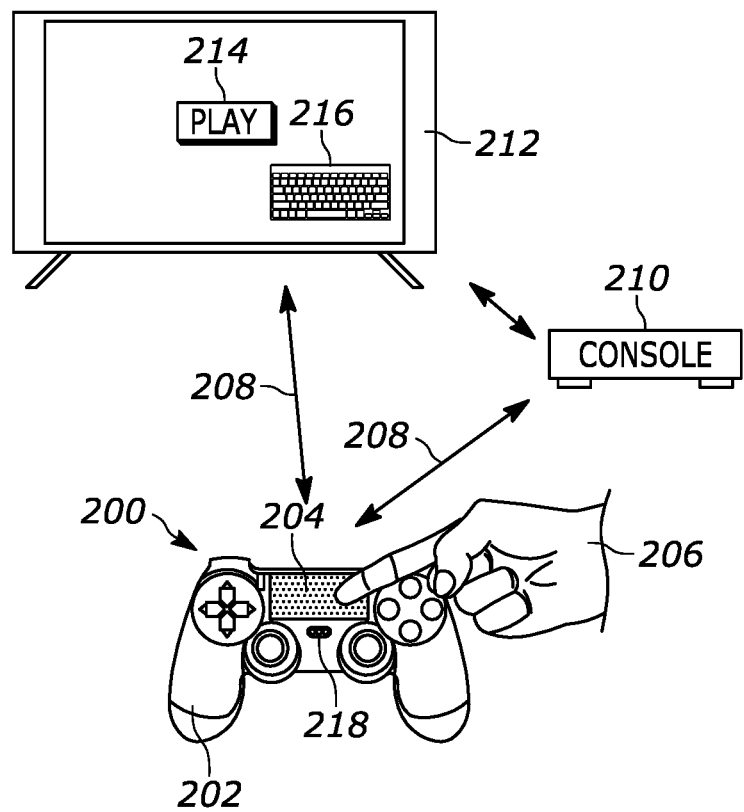
FIG. 2 is a perspective view of a computer simulation controller with a microphone and a touch pad being used for inputting text presented on a display such as a TV or other audio video device communicating with the game controller directly or via, e.g., a computer game console.

FIG. 2 illustrates a system 200 the components of which may incorporate appropriate components shown in FIG. 1. A computer simulation controller 202 such as a PlayStation® controller, Xbox® controller, or other controller may include a touchpad 204 that can receive touch signals from a hand 206 and communicate via wired and/or wireless paths 208 with a computer simulation console 210 and/or a display device 212 such as an Internet-enabled TV. As explained further below, the user can manipulate the touchpad 204 to generate alpha-numeric characters 214 for presentation on the display device 212 either through direct communication of signals with the display device or through the simulation console 210. More specifically, by manipulating the touchpad 204, a user can move a screen cursor over a letter on a virtual keyboard 216 presented on the display device 212 to enter the alpha-numeric characters 214. The virtual keyboard 216 may have, without limitation, a QWERTY layout.

Additionally, the controller 200 may include one or more microphones 218 communicating with the processor of the controller for purposes disclosed below. In the example shown, the microphone 218 is provided on the touchpad 204, although it is to be understood that the microphone 218 may be provided elsewhere on the housing of the controller 200 or indeed on another component if desired.

Figure 3:
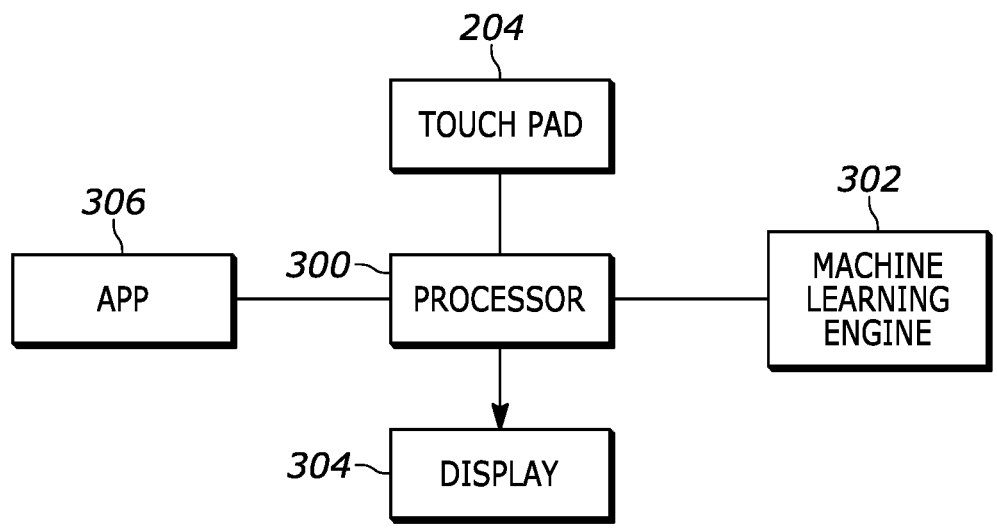
FIG. 3 is a block diagram of a simplified system according to present principles.

FIG. 3 illustrates that the touchpad 204 of FIG. 2 can provide input signals to one or more processors 300 such as any of the processors described herein that represent finger or thumb movement against the touchpad. The processor may execute logic on the signals as described elsewhere herein and provide input to one or more machine learning (ML) engines 302, which uses the input to output a predicted character for presentation on one or more displays 304 such as any of the displays described herein and/or for use by one or more computer applications 306, such as but not limited to word processing applications.

In an example implementation, the ML engine 302 may be implemented by a support vector machine (SVM) whose C-parameter and gamma-parameter are empirically optimized. The C parameter adds a penalty for each misclassified data point. The gamma-parameter controls the distance of influence of a single training point. A K-nearest neighbor (KNN) engine alternatively may be used.

Figure 4:
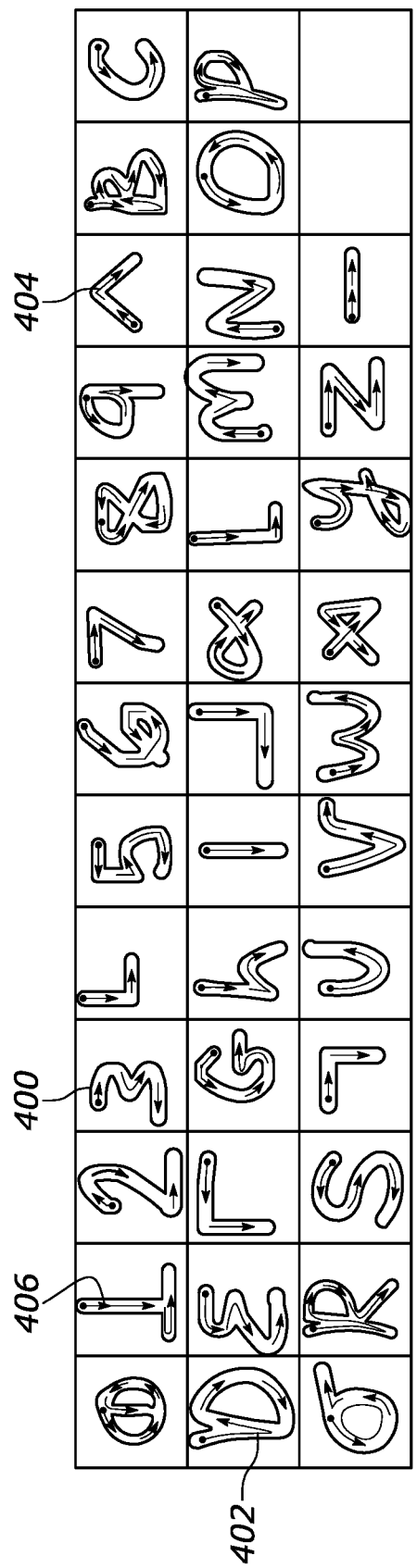
FIG. 4 illustrates various handwriting characters that can be drawn on a touchpad.

FIG. 4 illustrates various numerals 400, letters 402, and punctuation symbols 404 that can be traced by finger or thumb on the trackpads described herein. Note that the panel in FIG. 4 includes arrows 406 indicating the directions between successive points in time as each character is drawn. Current alphabet is similar to graffiti, however there are some differences. Graffiti relies on separate input area for letters and numbers whereas data on the trackpad is all captured on same input area. Users can modify inputs by adding drawings for a new character, e.g., 10-12 new drawings character gives 90%+ accuracy, and continues to add new data as that character is entered in future. This allows for multiple drawings of the same character depending on user preference or accessibility issues.

Figure 5:
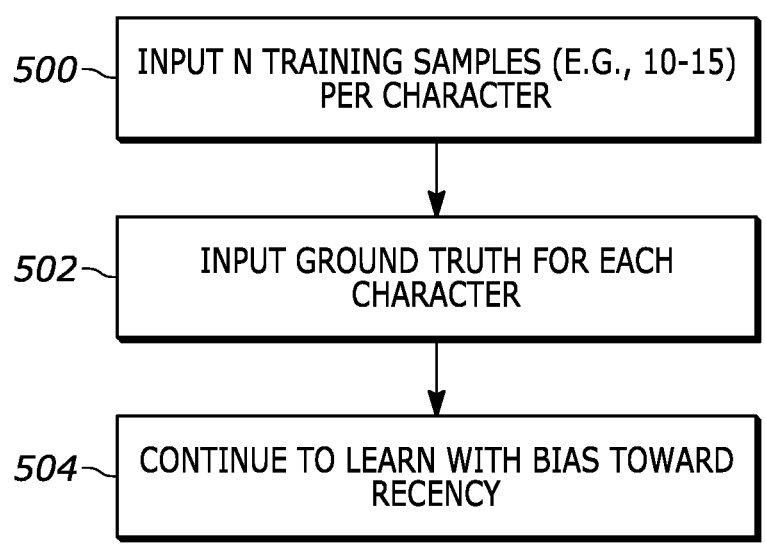
FIG. 5 illustrates example training logic in example flow chart format.

FIG. 5 illustrates the training process further. Commencing at block 500 "N" training samples such as 10-15 samples per character are input on the touchpad. Ground truth for each character is input at block 502. The ML engine learns in accordance with the operational flow chart steps of FIG. 6. Learning may be continued in a supervised manner at block 504, with bias given to more recent ground truth/character input if desired.

In an example implementation, a dataset of 14 k+ encoded feature vectors can be used to train the ML model. When an SVM is used, its parameters (primarily C- and gamma-parameters) are optimized for the current dataset. Reoptimization can be done if desired in a batched fashion. Subsequent users can add/retrain letters to their own preference with approximately ten example drawings to obtain about 90% accuracy. Note that initial and/or ongoing ML engine training may include tracking new drawings on the touchpad and adding them to dataset if the user "confirms" the prediction output from the ML engine is correct. In an example, "confirmation" may be indicated by the user not deleting the predicted character output on, e.g., a display, and moving on to next input.

Figure 6:
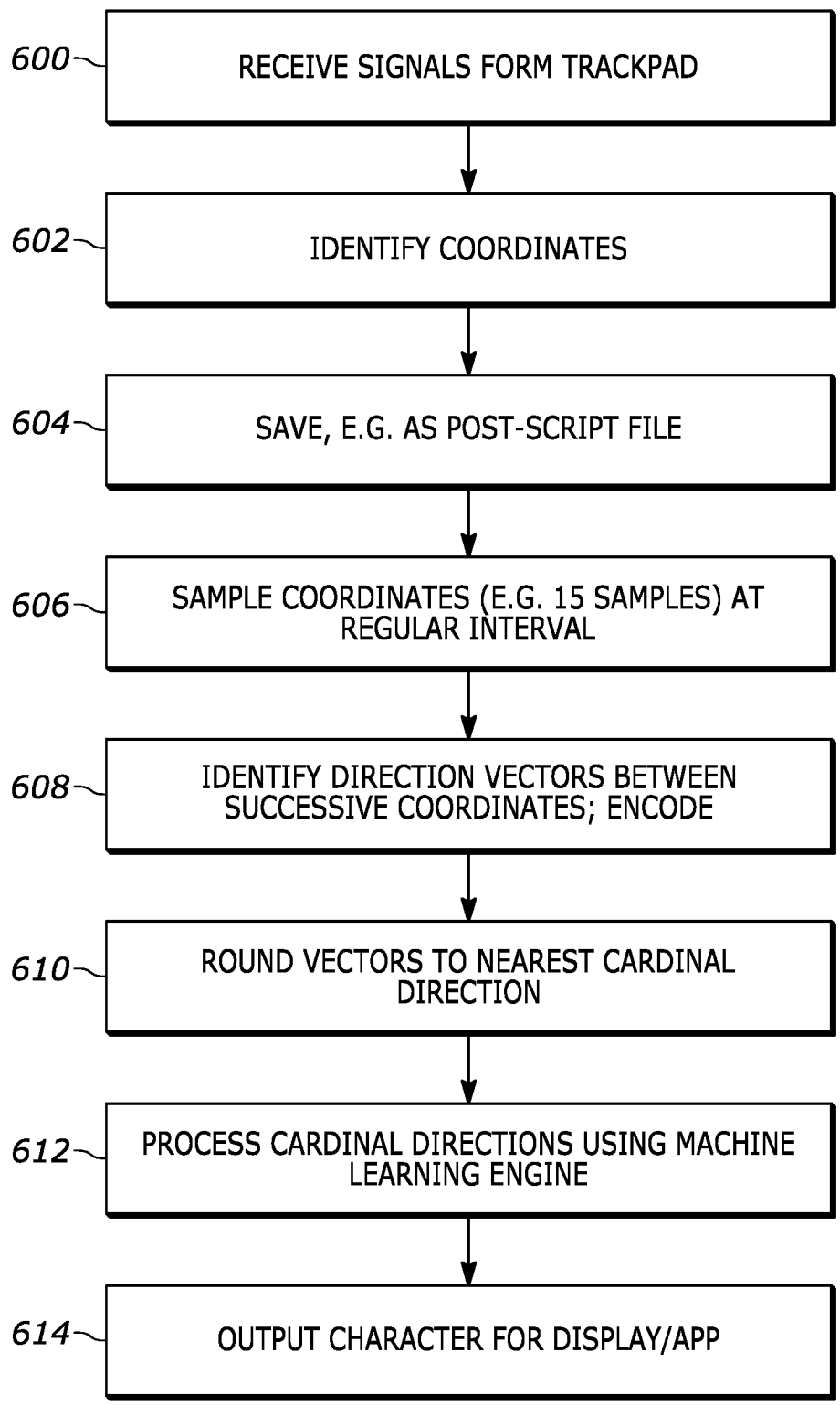
FIG. 6 illustrates example character recognition logic in example flow chart format.

Refer now to FIG. 6. Commencing at block 600, input signals are received from a trackpad of a computer simulation controller as may be generated by a person moving his or her finger or thumb or palm against the surface of the touchpad. The input signals represent coordinates of movement against the trackpad, which are identified at block 602. Because the signals can be time-stamped, the sequence of coordinates represented by the input signals can be arranged chronologically. At block 604, the coordinates are saved, e.g., as a postscript file.

Moving to block 606, the coordinates are sampled, preferably at a regular or constant interval equaling the total integer number of the coordinates divided by a number of samples to render a set of sample coordinates. The total number of coordinates is an integer greater than the number of samples. In example embodiments, the number of samples is between ten and twenty and in one embodiment the number of samples is fifteen.

Proceeding to block 608, the direction vectors between successive sample coordinates is determined. This may be done using plane geometry operations on the Euclidean coordinates in two-dimensional space. If desired, the direction vectors may be encoded into binary representations such as those discussed below in relation to FIG. 7.

Moving to block 610, the direction vectors are rounded to their nearest cardinal direction to render a sequence of cardinal directions that are input to the ML engine at block 612, which outputs at block 614 a predicted character in response for display of the character or use of the character in an application such as but not limited to a word processing application. The predicted character typically is an alphanumeric character or symbol represented by the movement against the trackpad.

In an example, the cardinal directions include a set of eight directions and for ease of exposition may be considered to consist of north, northwest, west, southwest, south, southeast, east, and northeast. In this case, "north" may be the direction between the user and the edge of the trackpad further from the user when the controller is held as intended, although the reference point for "north" (and, hence, the other cardinal directions) may be arbitrary. Indeed, more generally the cardinal directions may be eight in number, or fewer than eight in number, or greater than eight in number, and are evenly spaced from each other around 360 degrees typically separated from each immediately adjacent cardinal direction by a constant number of degrees greater than two degrees, more preferably greater than twenty degrees, and in the example of eight cardinal directions, are separated by forty five degrees. When only four cardinal directions are used, they are separated from each other by ninety degrees. When ten cardinal directions are used, they are separated from each other by thirty-six degrees. In general, the cardinal directions include only a fixed number of directions separated from each other by a constant number of degrees and having fixed directions relative to a reference direction.

By "rounding" is meant changing each direction vector identified at block 608 to be the cardinal direction that is nearest in degrees to the respective direction vector. For a direction vector identified at block 608 that already is oriented at a cardinal direction, no rounding is necessary. For a direction vector identified at block 608 that is oriented exactly between two cardinal directions, the direction vector may be rounded up to the next highest cardinal direction, or rounded down to the next lower cardinal direction, or discarded and not used at all as being indeterminate.

FIG. 7 illustrates an encoding 700 of a sequence of direction vectors and/or a cardinal directions into binary representations. Each vector/direction may be represented by an initial bit 702 followed[JLR1] by a string 704 of binary numbers representing the direction. To generate the strings 704, the series of coordinates is extracted from the data structure generated at block 604 in FIG. 6, the coordinates are sampled at a constant interval (interval=total # of coordinates/desired number of samples), and an unencoded feature vector generated thereby, e.g., (0, W, SW, S, S, SE, E, E, NE, N, NW, NW, NW, NW, S, S). The unencoded feature vector can then be encoded as shown in FIG. 7 prior to further processing in binary code.

It will be appreciated that whilst present principals have been described with reference to some example embodiments, these are not intended to be limiting, and that various alternative arrangements may be used to implement the subject matter claimed herein.

The invention claimed is:

1. An apparatus, comprising:
at least one processor programmed with instructions to:
receive input signals from a trackpad of a computer simulation controller, the input signals representing coordinates of movement against the trackpad;
sample the coordinates at an interval equaling a total number of the coordinates divided by a number of samples to render a set of sample coordinates, wherein the total number of coordinates is an integer greater than the number of samples;
determine directions between successive sample coordinates;
round each direction to a respective nearest cardinal direction; and
process the nearest cardinal directions using a machine learning (ML) engine to output an alpha-numeric character represented by the movement against the trackpad.

2. The apparatus of claim 1, wherein the cardinal directions comprise a fixed number of directions separated from each other by a constant number of degrees and having fixed directions relative to a reference direction.

3. The apparatus of claim 2, wherein the cardinal directions consist of north, northwest, west, southwest, south, southeast, east, and northeast.

4. The apparatus of claim 1, wherein the number of samples is between ten and twenty.

5. The apparatus of claim 4, wherein the number of samples is fifteen.

6. The apparatus of claim 1, wherein the ML engine comprises a support vector machine (SVM).

7. The apparatus of claim 1, wherein the instructions are executable to bias the ML engine for recency of input.

8. The apparatus of claim 1, wherein the instructions are executable to encode the directions between successive sample coordinates into binary representations.

9. The apparatus of claim 1, wherein the processor is implemented by the computer simulation controller.

10. A device comprising:
at least one computer storage that is not a transitory signal and that comprises instructions executable by at least one processor to:
receive input from a touchpad;
convert the input to direction vectors;
identify from each direction vector a respective cardinal direction; and
using the cardinal directions, output a predicted alpha-numeric character representing the input, wherein the input is represented by coordinates and the instructions are executable to:
sample the coordinates at an interval equaling a total number of the coordinates divided by a number of samples to render a set of sample coordinates;
determine the direction vectors between successive sample coordinates prior to identifying a respective cardinal direction; and
input the cardinal directions to at least one machine learning (ML) model; and
output from the at least one ML model the predicted alpha-numeric character.

11. The device of claim 10, wherein the cardinal directions comprise a fixed number of directions separated from each other by a constant number of degrees and having fixed directions relative to a reference direction.

12. The device of claim 11, wherein the cardinal directions consist of north, northwest, west, southwest, south, southeast, east, and northeast.

13. The device of claim 10, wherein the number of samples is between ten and twenty.

14. The device of claim 13, wherein the number of samples is fifteen.

15. The device of claim 10, wherein the at least one ML model comprises a support vector machine (SVM).

16. The device of claim 10, wherein the instructions are executable to encode the directions between successive sample coordinates into binary representations.

17. The device of claim 10, wherein the computer storage is implemented by a computer simulation controller.

* * * * *